United States Patent
Husemann et al.

(10) Patent No.: US 6,703,441 B2
(45) Date of Patent: Mar. 9, 2004

(54) ORIENTED ACRYLIC BLOCK COPOLYMERS

(75) Inventors: Marc Husemann, Hamburg (DE); Thilo Dollase, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 0 days.

(21) Appl. No.: 10/202,366

(22) Filed: Jul. 24, 2002

(65) Prior Publication Data

US 2003/0114582 A1 Jun. 19, 2003

(30) Foreign Application Priority Data

Nov. 16, 2001 (DE) ................................ 101 56 088

(51) Int. Cl.$^7$ ................................ C08L 31/02
(52) U.S. Cl. .................. 524/558; 428/355; 428/343; 526/317.1; 526/318; 526/319; 526/329.2; 526/346
(58) Field of Search ................ 428/355, 343; 526/317.1, 318, 319, 329.2, 346; 524/558

(56) References Cited

U.S. PATENT DOCUMENTS

| | | | |
|---|---|---|---|
| 4,581,429 A | 4/1986 | Solomon et al. | 526/220 |
| 5,091,237 A | 2/1992 | Schloegl et al. | 428/215 |
| 5,767,210 A | 6/1998 | Lecomte et al. | 526/166 |
| 5,789,487 A | 8/1998 | Matyjaszewski et al. | 525/301 |
| 5,811,500 A | 9/1998 | Dubois et al. | 526/145 |
| 5,854,364 A | 12/1998 | Senninger et al. | 526/192 |
| 5,866,249 A * | 2/1999 | Yarusso et al. | 428/355 |
| 5,919,871 A | 7/1999 | Nicol et al. | 525/333.8 |
| 5,945,491 A | 8/1999 | Matyjaszewski et al. | 526/111 |
| 6,114,482 A | 9/2000 | Senninger et al. | 526/172 |

FOREIGN PATENT DOCUMENTS

| | | | |
|---|---|---|---|
| DE | 3735272 A1 | 10/1986 | B32B/27/32 |
| DE | 199 49 352 A1 | 4/2000 | C07D/241/52 |
| DE | 100 36 802 A1 | 2/2002 | C09J/153/00 |
| EP | 0 348 749 A2 | 6/1989 | B32B/37/32 |
| EP | 0 544 098 A2 | 10/1992 | B32B/27/32 |
| EP | 0 735 052 A2 | 10/1996 | C08F/2/38 |
| EP | 0 824 110 A1 | 2/1998 | C08F/4/00 |
| EP | 0 824 111 A1 | 2/1998 | C08F/4/00 |
| EP | 0 826 698 A1 | 3/1998 | C08F/4/00 |
| EP | 0 841 346 A1 | 5/1998 | C08F/4/00 |
| EP | 0 850 957 A1 | 7/1998 | C08F/4/40 |
| EP | 1 008 640 | 6/2000 | C09J/153/00 |
| EP | 1 127 934 | 8/2001 | C09J/153/00 |
| EP | 1 132 410 | 9/2001 | C08F/6/28 |
| GB | 2 342 649 A | 4/2000 | C07D/233/30 |
| WO | WO 96/24620 | 8/1996 | C08F/4/00 |
| WO | WO 98/01478 | 1/1998 | C08F/2/38 |
| WO | WO 98/13392 | 4/1998 | C08F/4/00 |
| WO | WO 98/44008 | 10/1998 | C08F/4/00 |
| WO | WO 99/31144 | 6/1999 | C08F/2/38 |
| WO | WO 00/39233 | 7/2000 | C09J/153/00 |

OTHER PUBLICATIONS

English Language Abstract of DE 10036802 (Feb. 7, 2002).
English Language Abstract of DE 3735272 (Oct. 22, 1986).
English Language Abstract of JP 11166057 A (Jun. 22, 1999).

* cited by examiner

*Primary Examiner*—David W. Wu
*Assistant Examiner*—William K Cheung
(74) *Attorney, Agent, or Firm*—Norris McLaughlin & Marcus

(57) ABSTRACT

An oriented pressure sensitively adhesive system comprising a pressure sensitive adhesive which is comprised of at least one block copolymer composed at least in part of (meth)acrylic acid derivatives, and at least one block copolymer comprising the unit P(A)-P(B)-P(A), where P(A) independently of one another represent homopolymer blocks or copolymer blocks of monomers A, the polymer blocks P(A) each having a softening temperature in the range from +20° C. to +175° C., P(B) represents a homopolymer block or copolymer block of monomers B, the polymer block P(B) having a softening temperature in the range from −130° C. to +10° C., wherein the refractive index $n_{MD}$ measured in one direction is greater than the refractive index $n_{CD}$ measured in a direction perpendicular to that direction.

35 Claims, No Drawings

ORIENTED ACRYLIC BLOCK COPOLYMERS

BACKGROUND OF THE INVENTION

As a result of ever-increasing environmental regulations and cost pressure, there is at present a trend toward the preparation of PSAs containing small amounts, if any, of solvent. This objective can most simply be realized through the hotmelt technology. A further advantage is the shortening in production time. In hotmelt units, adhesives can be laminated to backings or release paper significantly more quickly, thus saving time and money.

Hotmelt technology, however, is imposing ever-higher requirements on the adhesives. For high-grade industrial applications, polyacrylates in particular are preferred on account of their transparency and weathering stability.

To produce acrylic hotmelts, conventionally, acrylic monomers are polymerized in solution and then the solvent is removed in a concentration process in an extruder. Beside the advantages in transparency and weathering stability, however, acrylic PSAs also have to meet stringent requirements in the area of shear strength. This is achieved by means of polyacrylates of high molecular weight, high polarity, and subsequent efficient crosslinking.

Crosslinking, however, is a limiting factor for these acrylic hotmelts. UV crosslinking is not very suitable, since the depth of penetration of the UV radiation is limited to a maximum of 70 μm. This value reduces further if resins are included as bond strength promoter additives. An alternative technology available is that of electron beam crosslinking, although for acrylic compositions its crosslinking mechanism is extremely unfavorable, given that these PSAs are generally saturated, with no double bonds present. Consequently, this crosslinking is markedly inferior to the conventional thermal crosslinking for solventborne acrylic compositions, resulting in a lower level of thermal shear strength.

Another property for the coating of acrylic compositions from the melt is the phenomenon of the orientation of the polymer chains. For the properties of PSAs, this orientation of the macromolecules plays a significant part. As a result of the orientation, the corresponding polymers may acquire special properties, but generally at least acquire a planar anisotropy of the properties. Some examples, applying to polymers in general, of properties which can be influenced by the degree of orientation are strength and stiffness of the polymers and of the plastics produced from them, thermal conductivity, thermal stability, and anisotropic behavior with respect to permeability to gases and liquids (I.M. Ward, Structure and Properties of oriented polymers, 2nd ed. 1997, Kluwer, Dortrecht).

Interesting properties have likewise been found for oriented PSAs. For instance, the generation of a partial orientation in partly crystalline, rubber-based PSAs has already been described in U.S. Pat. No. 5,866,249. As a result of the anisotropic adhesive properties, innovative PSA applications are defined.

A disadvantage of the prior art PSAs is firstly that the acrylic hotmelts must be crosslinked in the process in order to obtain the orientation and secondly that the orientation slowly decreases over a prolonged period of time, as a result of structural relaxation.

It is an object of the present invention to provide PSA systems which have a predetermined profile of properties without additional crosslinking, said profile being retained over a prolonged period, without having to accept the disadvantages of the prior art. A further object is to specify a process for preparing such PSAs.

SUMMARY OF THE INVENTION

Surprisingly, and in a manner unforeseeable for the skilled worker, this object is achieved by the oriented, pressure sensitively adhesive systems as specified in the main claim. The subclaims relate to preferred developments of this PSA. Also claimed is a process for preparing PSAs of this kind, and their use.

The invention accordingly provides pressure sensitively adhesive systems at least comprising a pressure sensitive adhesive based on at least one block copolymer, the weight fractions of the block copolymers totaling at least 50% of the adhesive, one block copolymer being composed at least in part on the basis of (meth)acrylic acid derivatives (1), additionally at least one block copolymer comprising at least the unit P(A)-P(B)-P(A) comprising at least one polymer block P(B) and at least two polymer blocks P(A) (2), where P(A) independently of one another represent homopolymer blocks or copolymer blocks of monomers A, the polymer blocks P(A) each having a softening temperature in the range from +20° C. to +175° C., P(B) represents a homopolymer block or copolymer block of monomers B, the polymer block P(B) having a softening temperature in the range from −130° C. to +10° C., the polymer blocks P(A) and P(B) are not homogeneously miscible with one another, a feature of the pressure sensitively adhesive system of the invention being that it is oriented, possessing a preferential direction, with the refractive index $n_{MD}$ measured in the preferential direction being greater than the refractive index $n_{CD}$ measured in a direction perpendicular to the preferential direction.

DETAILED DESCRIPTION

In the text below the polymer blocks P(A) are sometimes referred to as "hard blocks" and the polymer blocks P(B) as "elastomer blocks". Moreover, the block copolymers comprising the unit P(A)-P(B)-P(A) are referred to below as triblock copolymers, even when other blocks are present in the block copolymer.

By softening temperature in this context is meant, in the case of amorphous systems, the glass transition temperature and, in the case of semicrystalline polymers, the melting temperature. Glass transition temperatures are stated as results of quasistatic methods such as Differential Scanning Calorimetry (DSC), for example.

Preferably, one, more or all of the properties (1) and/or (2) indicated above for at least one block copolymer apply to two or more, or all, of the block copolymers present.

In one very preferred embodiment of the PSA systems, the difference Δn in the refractive indices, where $\Delta n = n_{MD} - n_{CD}$, is $\geq 1 \cdot 10^{-5}$.

Very preferably, the PSA systems have different stress-strain behavior in the lengthwise direction and in the crosswise direction.

Systems which have turned out to be particularly advantageous in the sense of the invention are those having a shrinkback of at least 5%. The shrinkback is measured in accordance with the test method described as method D in the experimental section. (The shrinkback of unbacked PSA strips is defined as the ratio of the length of a test strip, taken along the coating direction, shortly after coating and after one week.)

Particular preference is given to PSA systems in which the structure of at least one block copolymer, preferably of two or more or all the block copolymers, can be described by one or more of the following general formulae:

P(A)-P(B)-P(A)  (I)

P(B)-P(A)-P(B)-P(A)-P(B)  (II)

$[P(B)-P(A)]_n X$  (III)

$[P(B)-P(A)]_n X[P(A)]_m$  (IV), where n=3 to 12, m=3 to 12 and X is a polyfunctional branching unit, i.e., a chemical component via which different polymer arms are linked to one another, the polymer blocks P(A) independently of one another represent homopolymer or copolymer blocks of the monomers A, the polymer blocks P(A) each having a softening temperature in the range from +20° C. to +175° C., and the polymer blocks P(B) independently of one another represent homopolymer or copolymer blocks of the monomers B, the polymer blocks P(B) each having a softening temperature in the range from −130° C. to +10° C.

The polymer blocks P(A) as described in the main claim or in the advantageous embodiments may comprise polymer chains of one single type of monomer from group A or copolymers of monomers of different structures from group A. In particular, the monomers A used may vary in their chemical structure and/or in their side chain length. The polymer blocks therefore span the range between completely homogeneous polymers, via polymers of monomers with the same chemical parent structure but different chain length, and those with the same number of carbons but different isomerism, through to randomly polymerized blocks of monomers of different length with different isomerism, from group A. The same applies to the polymer blocks P(B) in respect of the monomers from group B.

The unit P(A)-P(B)-P(A) may be either symmetrical [corresponding to $P^1(A)$-P(B)-$P^2(A)$ where $P^1(A)=P^2(A)$] or asymmetric [corresponding, for instance, to the formula $P^3(A)$-P(B)-$P^4(A)$ where $P^3(A) \neq P^4(A)$, but where both $P^3(A)$ and $P^4(A)$ are each polymer blocks as defined for P(A)] in construction.

One advantageous embodiment is when at least one block copolymer, preferably two or more or all of the block copolymers, has a symmetrical construction such that polymer blocks P(A) which are identical in chain length and/or chemical structure and/or polymer blocks P(B) which are identical in chain length and/or chemical structure are present. $P^3(A)$ and $P^4(A)$ may differ in particular in their chemical composition and/or their chain length.

As monomers for the elastomer block P(B) it is advantageous to use acrylic monomers. For this purpose it is possible in principle to use any acrylic compounds which are familiar to the skilled worker and are suitable for the synthesis of polymers. Preference is given to choosing those monomers which result in the polymer block P(B), alone or in combination with one or more further monomers, having glass transition temperatures of less than +10° C. Accordingly, the vinyl monomers may be chosen with preference.

For preparing the polymer blocks P(B) it is advantageous to use from 75 to 100% by weight of acrylic and/or methacrylic acid derivatives of the general structure $CH_2=CH(R^1)(COOR^2)$  (V)

in which $R^1$=H or $CH_3$ and $R^2$=H or linear, branched or cyclic, saturated or unsaturated alkyl radicals having from 1 to 30, particularly from 4 to 18, carbon atoms and/or up to 25% by weight of vinyl compounds (VI) which advantageously contain functional groups.

Acrylic monomers used with very great preference as compounds (V) as components of polymer blocks P(B) include acrylates and methacrylates with alkyl groups composed of from 4 to 18 carbon atoms. Specific examples of appropriate compounds, without wishing to be restricted by this enumeration, include n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, the branched isomers thereof, such as 2-ethylhexyl acrylate and isooctyl acrylate, for example, and also cyclic monomers such as cyclohexyl or norbornyl acrylate and isobornyl acrylate, for example.

Furthermore, vinyl monomers from the following groups can optionally be used as monomers as defined for (VI) for polymer blocks P(B): vinyl esters, vinyl ethers, vinyl halides, vinylidene halides, and also vinyl compounds containing aromatic cycles and heterocycles in the α position. Here again, selected monomers which can be used in accordance with the invention may be mentioned by way of example: vinyl acetate, vinyl-formamide, vinylpyridine, ethyl vinyl ether, 2-ethylhexyl vinyl ether, butyl vinyl ether, vinyl chloride, vinylidene chloride, and acrylonitrile.

Further suitable, particularly preferred examples of monomers containing vinyl groups as defined for (VI) for the elastomer block P(B) include hydroxyethyl acrylate, hydroxypropyl acrylate, hydroxyethyl methacrylate, hydroxypropyl methacrylate, N-methylolacrylamide, acrylic acid, methacrylic acid, allyl alcohol, maleic anhydride, itaconic anhydride, itaconic acid, benzoin acrylate, acrylated benzophenone, acrylamide, and glycidyl methacrylate, to name but a few.

In one preferred embodiment of the inventive systems one or more of the polymer blocks comprise one or more grafted-on side chains. There is no restriction as to whether such systems are obtained by a graft-from process (polymerizational attachment of a side chain starting from an existing polymer backbone) or a graft-to process (attachment of polymer chains to a polymer backbone by way of polymer-analogous reactions). In particular for the preparation of such block copolymers it is possible as the monomers B to use monomers functionalized in such a way as to allow a graft-from process for the graft attachment of side chains. Mention may be made here in particular of acrylic and methacrylic monomers which carry halogen functionalization or any other functional groups which permit, for example, an ATRP (Atom Transfer Radical Polymerization) process. In this context, mention may also be made of the possibility of introducing side chains into the polymer chains in a targeted manner by way of macromonomers. The macromonomers may in turn be constructed in accordance with the monomers B.

In one special embodiment of this invention, the polymer blocks P(B) have installed into them one or more functional groups which permit radiation-chemical crosslinking of the polymer blocks, in particular by means of UV irradiation or by irradiation with rapid electrons. With this objective, monomer units which can be used include in particular acrylic esters which contain an unsaturated alkyl radical having from 3 to 18 carbon atoms and containing at least one carbon-carbon double bond. For acrylates modified with double bonds, allyl acrylate and acrylated cinnamates are suitable with particular advantage. Besides acrylic monomers, vinyl compounds with double bonds which are not reactive during the (radical) polymerization of the polymer block P(B) can be used with very great advantage as monomers for the polymer block P(B). Particularly preferred examples of such comonomers are isoprene and/or butadiene, but also chloroprene.

Starting monomers for the polymer blocks P(A) are preferably selected such that the resulting polymer blocks P(A) are immiscible with the polymer blocks P(B), so that microphase separation occurs. Advantageous examples of compounds which are used as monomers A are vinyl aromatics, which may also be alkylated, methyl methacrylate, cyclohexyl methacrylate, isobornyl methacrylate and isobornyl acrylate. Particularly preferred examples are methyl methacrylate and styrene, this listing making no claim to completeness.

In addition, however, the polymer blocks P(A) may also be constructed as a copolymer composed of at least 75% of the above monomers A, leading to a high softening temperature, or of a mixture of these monomers, but containing up to 25% of monomers B, leading to a reduction in the softening temperature of the polymer block P(A). By way of example but not exclusively, mention may be made in this context of alkyl acrylates, which are defined in accordance with the structure (V) and the comments made in relation to it.

In a further advantageous embodiment of the inventive pressure sensitive adhesive, polymer blocks P(A) and/or P(B) are functionalized in such a way that thermally initiated crosslinking can be conducted. The following, among others, may advantageously be chosen as crosslinkers: epoxides, aziridines, isocyanates, polycarbodiimides and metal chelates, to name but a few.

One preferred characteristic of the block copolymers used for the PSA systems of the invention is that their molar mass $M_n$ is between 25,000 and 600,000 g/mol, preferably between 30,000 and 400,000 g/mol, with particular preference between 50,000 and 300,000 g/mol. The fraction of the polymer blocks P(A) is advantageously between 5 and 49 percent by weight of the overall block copolymer, preferably between 7.5 and 35 percent by weight, with particular preference between 10 and 30 percent by weight. The polydispersity of the block copolymer is preferably less than 3, given by the ratio D of mass average $M_w$, to numerical average $M_n$ of the molar mass distribution.

The ratios of the chain lengths of the block copolymers P(A) to those of the block copolymers P(B) are chosen very advantageously in such a way that the block copolymers P(A) are present as a disperse phase ("domain") in a continuous matrix of the polymer blocks P(B). This is preferably the case at a polymer block P(A) content of less than about 25% by weight. The domains may preferably be in the form of spheres or distorted spheres. The formation of hexagonally packed cylindrical domains of the polymer blocks P(A) is likewise possible in the context of the invention. In a further embodiment an asymmetric design of the triblock copolymers is the aim, with the block lengths of the terminal polymer blocks P(A) in linear systems being different. The spherical morphology is especially preferable if an increase in the internal strength of the PSA is required, and also for the purpose of improving the mechanical properties.

In one version which is particularly preferred inventively, the molecular weight $M_n$ of the middle block P(B) is limited to 250,000 g/mol in order to facilitate coating of the PSA from the melt.

Furthermore, it may be advantageous to use blends of the abovementioned block copolymers with diblock copolymers P(A)-P(B), it being possible for the monomers used to prepare the corresponding polymer blocks P(A) and P(B) to be the same monomers as above. It may also be of advantage to add polymers P'(A) and/or P'(B) to the PSA composed of the block copolymers, especially of triblock copolymers (I), or the PSA composed of a block copolymer/diblock copolymer blend in order to improve its properties.

The invention accordingly further provides pressure sensitively adhesive systems with a preferential direction, wherein the pressure sensitive adhesive comprises a blend of one or more block copolymers with a diblock copolymer P(A)-P(B), where the polymer blocks P(A) (of the individual diblock copolymers) independently of one another represent homopolymer or copolymer blocks of the monomers A, the polymer blocks P(A) each having a softening temperature in the range from +20° C. to +175° C., and where the polymer blocks P(B) (of the individual diblock copolymers) independently of one another represent homopolymer or copolymer blocks of the monomers B, the polymer blocks P(B) each having a softening temperature in the range from −130° C. to +10° C., and/or with polymers P'(A) and/or P'(B), where the polymers P'(A) represent homopolymers and/or copolymers of the monomers A, the polymers P'(A) each having a softening temperature in the range from +20° C. to +175° C., where the polymers P'(B) represent homopolymers and/or copolymers of the monomers B, the polymers P'(B) each having a softening temperature in the range from −130° C. to +10° C., and where the polymers P'(A) and P'(B), respectively, are preferably miscible with the polymer blocks P(A) and P(B), respectively.

Where both polymers P'(A) and polymers P'(B) are admixed, they are advantageously chosen such that the polymers P'(A) and P'(B) are not homogeneously miscible with one another.

As monomers for the diblock copolymers P(A)-P(B) and for the polymers P'(A) and P'(B) respectively it is preferred to use the monomers of groups A and B already mentioned.

At least one diblock copolymer, preferably two or more or all of the diblock copolymers, has or have a molar mass $M_n$ of preferably between 5,000 and 600,000 g/mol, more preferably between 15,000 and 400,000 g/mol, with particular preference between 30,000 and 300,000 g/mol. They advantageously possess a polydispersity $D=M_w/M_n$ of not more than 3. It is favorable if the fraction of the polymer blocks P(A) in respect of the composition of the diblock copolymer is between 3 and 50% by weight, preferably between 5 and 35% by weight. The diblock copolymers as well may advantageously have one or more grafted-on side chains.

Typical concentrations in which diblock copolymers are used in the blend are up to 250 parts by weight per 100 parts by weight of higher block copolymers comprising the unit P(A)-P(B)-P(A). The polymer blocks P(A) and P(B) of the diblock copolymers may be constructed as homopolymer blocks and also as copolymer blocks. In accordance with the remarks made above, they are advantageously chosen so as to be compatible with the block copolymers P(A) and P(B), respectively, of the triblock copolymers. The chain length of the polymer blocks P(A) and P(B) respectively is preferentially chosen so that it does not exceed that of the polymer block with which it is preferentially miscible or associable, and is advantageously 10% lower, very advantageously 20% lower, than this. The B block may also be chosen such that its length does not exceed half the block length of the B block of the triblock copolymer.

Corresponding remarks apply to the polymers P'(A) and P'(B), respectively. These may be constructed as homopolymers and also as copolymers. In accordance with the remarks made above, they are advantageously chosen so as to be compatible with the block copolymers P(A) and P(B), respectively, of the triblock copolymers and/or of the diblock copolymers. The chain length of the polymers P'(A) and P'(B) respectively is preferentially chosen such that it does not exceed that of the polymer block with which they are preferentially miscible or associable, and is advantageously 10% lower, very advantageously 20% lower, than this.

In order to prepare the block copolymers it is possible in principle to use any polymerizations which proceed in accordance with controlled-growth or living mechanisms, including combinations of different controlled polymerization processes. Without making any claim to completeness, mention may be made here by way of example, in addition to anionic polymerization, of ATRP, nitroxide/TEMPO-controlled polymerization or, more preferably, the RAFT process; that is, in particular, processes which permit control over the block lengths, polymer architecture or else, but not necessarily, the tacticity of the polymer chain.

Radical polymerizations may be conducted in the presence of an organic solvent or in the presence of water or in mixtures of organic solvents and/or organic solvents with water, or without the solvent. It is preferred to minimize the amount of solvent used. The polymerization time for free-radical processes, depending on conversion and temperature, is typically between 4 and 72 hours.

In the case of solution polymerization, solvents used are preferably esters of saturated carboxylic acids (such as ethyl acetate), aliphatic hydrocarbons (such as n-hexane, n-heptane or cyclohexane), ketones (such as acetone or methyl ethyl ketone), special boiling point spirit, aromatic solvents such as toluene or xylene, or mixtures of the aforementioned solvents. For polymerization in aqueous media or in mixtures of organic and aqueous solvents, it is preferred to add emulsifiers and stabilizers for the polymerization. Where a radical polymerization method is chosen, it is advantageous to make use, as polymerization initiators, of customary radical-forming compounds such as peroxides, azo compounds, and peroxosulfates, for example. Initiator mixtures are also outstandingly suitable.

In a favorable procedure, radical stabilization is effected using nitroxides of type (VIIa) or (VIIb):

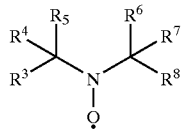

(VIIa)

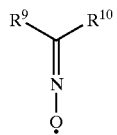

(VIIb)

where $R^3$, $R^4$, $R^5$, $R^6$, $R^7$, $R^8$, $R^9$ and $R^{10}$ independently of one another denote the following compounds or atoms:

i) halides, such as chlorine, bromine or iodine, for example,
ii) linear, branched, cyclic and heterocyclic hydrocarbons having from 1 to 20 carbon atoms, which may be saturated, unsaturated, or aromatic,
iii) esters —$COOR^{11}$, alkoxides —$OR^{12}$ and/or phosphonates —$PO(OR^{13})_2$, where $R^{11}$, $R^{12}$, and $R^{13}$ stand for radicals from group ii).

Compounds of formula (VIIa) or (VIIb) may also be attached to polymer chains of any kind (primarily in the sense that at least one of the abovementioned radicals constitutes a polymer chain of this kind) and may therefore be used to construct the block copolymers, as macroradicals or macroregulators.

More preferably, compounds of the following type are used as controlled regulators for the polymerization:

2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6,-tetraethyl-1-piperidinyloxyl, 2,2,6-trimethyl-6-ethyl-1-piperidinyloxyl N-tert-butyl 1-phenyl-2-methylpropyl nitroxide
N-tert-butyl 1-(2-naphthyl)-2-methylpropyl nitroxide
N-tert-butyl 1-diethylphosphono-2,2-dimethylpropyl nitroxide
N-tert-butyl 1-dibenzylphosphono-2,2-dimethylpropyl nitroxide
N-(1-phenyl-2-methylpropyl) 1-diethylphosphono-1-methylethyl nitroxide
di-t-butyl nitroxide
diphenyl nitroxide
t-butyl t-amyl nitroxide.

A range of further polymerization methods in accordance with which the PSAs can be prepared in an alternative procedure may be chosen from the prior art: U.S. Pat. No. 4,581,429 A discloses a controlled-growth radical polymerization process which uses as its initiator a compound of the formula R'R"N-O-Y, in which Y denotes a free radical species which is able to polymerize unsaturated monomers. In general, however, the reactions have low conversion rates. A particular problem is the polymerization of acrylates, which takes place only with very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process in which very specific radical compounds, such as phosphorus-containing nitroxides based on imidazolidine, are used. WO 98/44008 A1 discloses specific nitroxyls based on morpholines, piperazinones, and piperazinediones. DE 199 49 352 A1 describes heterocyclic alkoxyamines as regulators in controlled-growth radical polymerizations. Corresponding further developments of the alkoxyamines or of the corresponding free nitroxides improve the efficiency for the preparation of polyacrylates (Hawker, contribution to the National Meeting of the American Chemical Society, Spring 1997; Husemann, contribution to the IUPAC World Polymer Meeting 1998, Gold Coast).

As a further controlled polymerization method, atom transfer radical polymerization (ATRP) can be used advantageously to synthesize the block copolymers, in which case use is made preferably, as initiator, of monofunctional or difunctional secondary or tertiary halides and, for abstracting the halide(s), of complexes of Cu, Ni, Fe, Pd, Pt, Ru, Os, Rh, Co, Ir, Ag or Au (EP 0 824 111 A1; EP 826 698 A1; EP824 110 A1; EP 841 346 A1; EP 850 957 A1). The various possibilities of ATRP are further described in U.S. Pat. No. 5,945,491 A, U.S. Pat. No. 5,854,364 A and U.S. Pat. No. 5,789,487 A.

Additionally and advantageously, the block copolymer used in accordance with the invention may be prepared by an anionic polymerization. In this case the reaction medium used preferably comprises inert solvents, such as aliphatic and cycloaliphatic hydrocarbons, for example, or else aromatic hydrocarbons.

The living polymer is generally represented by the structure $P_L(A)$-Me, in which Me is a metal from group I of the Periodic Table, such as lithium, sodium or potassium, and $P_L(A)$ is a growing polymer block of the monomers A. The molar mass of the polymer block to be prepared is determined by the ratio of initiator concentration to monomer concentration. In order to construct the block structure, first of all the monomers A are added for constructing a polymer block P(A), then by adding the monomers B a polymer block P(B) is attached, and thereafter, by renewed addition of monomers A, a further polymer block P(A) is polymerized on, thus forming a triblock copolymer P(A)-P(B)-P(A). Alternatively, P(A)-P(B)-M can be coupled by means of an appropriate difunctional compound. In this way, starblock copolymers $(P(B)-P(A))_n$ are also obtainable. Examples of suitable polymerization initiators include n-propyllithium, n-butyllithium, sec-butyllithium, 2-naphthyllithium, cyclohexyllithium or octyllithium, with this listing making no claim to completeness. Furthermore, initiators based on samarium complexes are known for polymerizing acrylates (Macromolecules, 1995, 28, 7886) and can be used here.

Moreover, it is also possible to use difunctional initiators, such as 1,1,4,4-tetraphenyl-1,4-dilithiobutane or 1,1,4,4-tetraphenyl-1,4-dilithioisobutane, for example. Coinitiators may likewise be used. Suitable coinitiators include lithium halides, alkali metal alkoxides or alkylaluminum compounds. In one very preferred version the ligands and coinitiators are chosen such that acrylic monomers, such as n-butyl acrylate and 2-ethylhexyl acrylate, can be polymerized directly and need not be generated in the polymer by a transesterification with the corresponding alcohol.

A very preferred preparation process conducted is a variant of the RAFT polymerization (reversible addition-fragmentation chain transfer polymerization). The polymerization process is described in detail, for example, in WO 98/01478 A1 and WO 99/31144 A1. Suitable for preparing triblock copolymers, with particular advantage, are trithiocarbonates of the general structure R'''-S-C(S)-S-R''' (Macromolecules 2000, 33, 243–245), by means of which, in a first step, monomers for the end blocks P(A) are polymerized. Then, in a second step, the middle block P(B) is synthesized. Following the polymerization of the end blocks P(A), the reaction can be terminated and reinitiated. It is also possible to carry out polymerization sequentially without interrupting the reaction. In one very advantageous variant use is made, for example, of the trithiocarbonates (VIII) and (IX) or the thio compounds (X) and (XI) for the polymerization, in which φ can be a phenyl ring, which may be unfunctionalized or functionalized by alkyl or aryl substituents attached directly or by way of ester or ether bridges, or can be a cyano group, or can be a saturated or unsaturated aliphatic radical. The phenyl ring φ may optionally carry one or more polymer blocks, such as polybutadiene, polyisoprene, polychloroprene or poly(meth)acrylate, which may be constructed in accordance with the definition for P(A) or P(B), or polystyrene, to name but a few. Functionalizations can be, for example, halogens, hydroxyl groups, epoxide groups, groups containing nitrogen or sulfur, without this list making any claim to completeness.

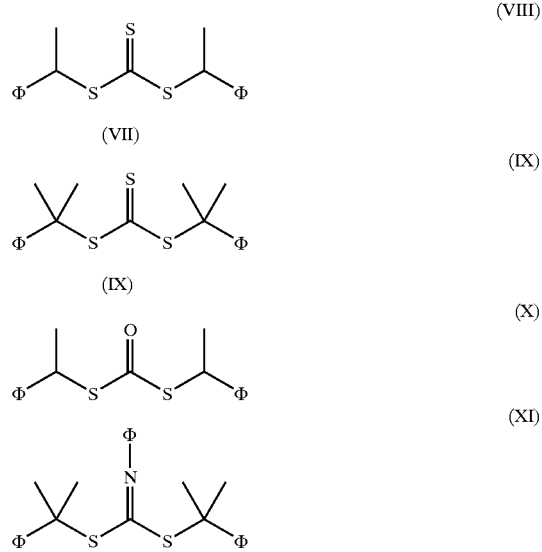

Use may also be made of thioesters of the general structure $R^{IV}$—C(S)—S—$R^V$, particularly in order to prepare asymmetric systems. $R^{IV}$ and $R^V$ may be chosen independently of one another, and $R^{IV}$ can be a radical from one of the following groups i) to iv) and $R^V$ a radical from one of the following groups i) to iii):

i) $C_1$ to $C_{18}$ alkyl, $C_2$ to $C_{18}$ alkenyl, $C_2$ to $C_{18}$ alkynyl, in each case linear or branched; aryl, phenyl, benzyl, aliphatic and aromatic heterocycles.

ii) —$NH_2$, —NH-$R^{VI}$, —$NR^{VI}R^{VII}$, —NH—C(O)-$R^{VI}$, —$NR^{VI}$-C(O)-$R^{VII}$, —NH—C(S)-$R^{VI}$, —$NR^{VI}$-C(S)-$R^{VII}$,

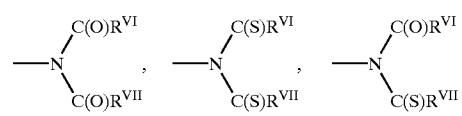

in which $R^{VI}$ and $R^{VII}$ are radicals chosen independently of one another from group i).

iii) —S-$R^{VIII}$, —S—C(S)-$R^{VIII}$, in which $R^{VIII}$ can be a radical from one of groups i) or ii).

iv) —O-$R^{VIII}$, —O—C(O)-$R^{VIII}$, in which $R^{VIII}$ can be a radical from one of groups i) or ii).

In conjunction with the abovementioned polymerizations which proceed in accordance with controlled-growth, free-radical mechanisms it is preferred to use initiator systems further comprising other free-radical polymerization initiators, especially radical-forming azo or peroxo initiators which decompose thermally. In principle, however, any customary initiators which are known for acrylates are suitable for this purpose. The production of C-centered radicals is described in Houben-Weyl, Methoden der Organischen Chemie, Vol. E19a, p. 60ff. These methods are employed preferentially. Examples of radical sources are peroxides, hydroperoxides, and azo compounds. As some nonexclusive examples of typical radical initiators, mention may be made here of: potassium peroxodisulfate, dibenzoyl peroxide, cumene hydroperoxide, cyclohexanone peroxide, cyclohexylsulfonyl acetyl peroxide, di-tert-butyl peroxide, azodiisobutyronitrile, diisopropyl percarbonate, tert-butyl peroctoate, and benzpinacol. In one very preferred variant the radical initiator used is 1,1'-azobis(cyclohexylnitrile) (Vazo 88®, DuPont®) or 2,2-azobis(2-methylbutanenitrile) (Vazo 67®, DuPont®). It is also possible, furthermore, to use radical sources which release free radicals only under UV irradiation.

In the conventional RAFT process, polymerization is generally carried out only to low conversion rates (WO 98/01478 A1) in order to produce molecular weight distributions as narrow as possible. As a result of the low conversion rates, however, these polymers cannot be used as PSAs and in particular not as hotmelt PSAs, since the high residual monomer fraction adversely affects the technical adhesive properties; the residual monomers which contaminate the solvent recyclate in the concentration process, and the corresponding self-adhesive tapes would exhibit very high outgassing.

In accordance with the invention, the solvent is preferably stripped off under reduced pressure in a concentrating extruder, for which purpose it is possible, for example, to use single-screw or twin-screw extruders which preferentially distill off the solvent in different or identical vacuum stages and which possess a feed preheater.

For advantageous further development in accordance with the invention it is possible to admix tackifier resin to the block copolymer pressure sensitive adhesives. In principle, all resins which are soluble in the corresponding polyacrylate middle block P(B) can be used. Suitable tackifier resins include rosin and rosin derivatives (rosin esters, including rosin derivatives stabilized by disproportionation or hydrogenation, for example), polyterpene resins, terpene-phenolic resins, alkylphenol resins, aliphatic, aromatic, and aliphatic-aromatic hydrocarbon resins, to name but a few. The resins chosen are primarily those which are preferentially compatible with the elastomer block. The weight fraction of the resins in the block copolymer is typically up to 40% by weight, more preferably up to 30% by weight.

For one specific embodiment of the invention it is also possible to use resins which are compatible with the polymer block P(A).

In addition, it is possible optionally to add plasticizers, fillers (e.g. fibers, carbon black, zinc oxide, titanium dioxide, chalk, solid or hollow glass beads, microbeads of other materials, silica, silicates), nucleators, blowing agents, compounding agents and/or aging inhibitors, in the form of primary and secondary antioxidants, for example, or in the form of light stabilizers.

The internal strength (cohesion) of the PSA is preferably brought about by the physical crosslinking of the polymer blocks P(A). The physical crosslinking thus obtained is typically thermoreversible. For nonreversible crosslinking, the PSAs may additionally be subjected to chemical crosslinking. For this purpose the acrylic block copolymer pressure sensitive adhesives used for the reversible systems of the invention may optionally comprise compatible crosslinker substances. Examples of suitable crosslinkers include metal chelates, polyfunctional isocyanates, polyfunctional amines, and polyfunctional alcohols. Polyfunctional acrylates can also be used with advantage as crosslinkers for actinic irradiation.

For optional crosslinking with UV light, UV-absorbing photoinitiators are added to the polyacrylate block copolymers which are employed in the systems of the invention. Useful photoinitiators which can be used to very good effect include benzoin ethers, such as benzoin methyl ether and benzoin isopropyl ether, for example, substituted acetophenones, such as 2,2-diethoxyacetophenone (available as Irgacure 651® from Ciba Geigy®), 2,2-dimethoxy-2-phenyl-1-phenylethanone, dimethoxyhydroxyaceto-phenone, for example, substituted $\alpha$-ketols, such as 2-methoxy-2-hydroxypropiophenone, for example, aromatic sulfonyl chlorides, such as 2-naphthylsulfonyl chloride, for example, and photoactive oximes, such as 1-phenyl-1,2-propanedione 2-(O-ethoxycarbonyl)oxime.

The abovementioned photoinitiators and others which can be used, including those of the Norrish I or Norrish II type, may contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholine ketone, amino ketone, azobenzoin, thioxanthone, hexaarylbisimidazole, triazine, or fluorenone, it being possible for each of these radicals to be further substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. For further details, Carroy et al. in "Chemistry and Technology of UV and EB Formulation for Coatings, Inks and Paints", Oldring (Ed.), 1994, SITA, London can be consulted.

Also claimed is a process for preparing oriented pressure sensitive adhesive systems based on above-described block copolymers, said process being outstandingly suitable in particular for preparing the inventive, pressure sensitively adhesive systems. In this process the pressure sensitive adhesive is coated from the melt, and in particular is stretched in the process.

Coating takes place advantageously through a melt die or through an extrusion die onto a backing material, the orientation being produced by stretching of the pressure sensitive adhesive tape film.

The extrusion coating takes place preferably through an extrusion die. Extrusion dies can be subdivided into three categories: T dies, fishtail dies, and coathanger dies. The individual types differ in the design of their flow channel. For preparing oriented acrylic hotmelt block copolymer PSAs, especially the pressure sensitively adhesive systems described above, it is preferred to carry out coating onto a backing using a coathanger die, specifically such that a polymer layer is formed on the backing by a movement of the die relative to the backing. In the case of extrusion die coating, the gap width of the die at the exit is greater than the thickness of the applied PSA film. Orientation therefore comes about by stretching. The orientation of the PSA following coating is retained as a result of the self-organization of the PSA; that is, a physical network of hard block domains P(A) is formed. Analogously, an orientation of acrylic block copolymer PSAs may also be produced with the melt die coating process.

The nature of the orientation within the PSAs is dependent both on the die temperature and coating temperature and on the temperature of the backing material. The best orientation effects are obtained by depositing onto a cold surface. Therefore, the backing material should be cooled directly during coating, by means of a roll. The roll can be cooled by a film of liquid, from the outside, or from the inside, or by a cooling gas. Additionally, the coating temperature and die temperature should be lowered in order to obtain a high degree of orientation. The degree of orientation is freely adjustable by the die gap width. The thicker the PSA film expressed from the extrusion die, the greater the extent to which the adhesive can be stretched to a relatively thin PSA film on the backing material. This stretching operation may be adjusted freely not only by the freely adjustable die width but also by the web speed of the accepting backing material. The adhesive is oriented by the coating operation.

Furthermore, the design of the melt die or extrusion die may likewise control the extent of orientation. The coating speeds may also be mentioned in this context, since at higher speeds a higher shear rate is likewise introduced, and thus the orientation is intensified. The anisotropy may also be produced later on, by stretching an acrylic PSA on an extensible backing. Stretching may be carried out either monoaxially or biaxially.

As well as by the process, the orientation may also be controlled by the composition of the block copolymers. In general, the extent of orientation goes up as the overall molecular weight increases, as the hard block domain fraction P(A) increases, and as the polarity of the middle block P(B) increases, in each case assuming identical coating temperature, coating speed, and draw ratio.

The oriented acrylic hotmelts, as they are or in the form of blends, are coated onto a backing. Suitable backing materials include, in principle, BOPP, PET, nonwoven, PVC, metal foils, foam, or release papers (glassine, HDPE, LDPE). For the purpose of determining the shrinkback in the free film, coating onto a release paper or release film is recommended. Otherwise, any backing materials familiar to the skilled worker for producing transfer tapes or single-sided and double-sided PSA tapes can be used. The orientation of the adhesive can be measured using a polarimeter, by means of infrared dichroism, or by X-ray scattering. A further method, particularly preferred for the inventive PSAs, is the measurement of the shrinkback in the free film. These measurement methods are described in detail under the experimental test methods (method D).

In principle it is also possible to crosslink the PSAs used in accordance with the invention with electron beams. Typical irradiation apparatus which may be employed includes linear cathode systems, scanner systems, and segmented cathode systems, where electron beam accelerators are concerned. A detailed description of the state of the art, and the most important process parameters, can be found in Skelhorne, Electron Beam Processing, in Chemistry and Technology of UV and EB formulation for Coatings, Inks and Paints, Vol. 1, 1991, SITA, London. The typical acceleration voltages are in the range between 50 kV and 500 kV, preferably between 80 kV and 300 kV. The scatter doses employed range between 5 and 150 kGy, in particular between 20 and 100 kGy.

The invention further provides for the use of these oriented pressure sensitive adhesives as and for producing single-sided and double-sided pressure sensitive adhesive tapes, and also as transfer tapes.

Exemplary product structures may be advantageous for the PSA systems of the invention:

PSA systems with a single-layer product structure, the layer being composed of a PSA as described above;

PSA systems with a multilayer product structure, especially a two-layer or three-layer product structure, where at least one of the layers is composed of a PSA as described above and preferably has a thickness of at least 10 $\mu$m, with particular preference at least 25 $\mu$m, and where preferably one of the other layers is composed of an elastomer;

PSA systems comprising at least one backing or carrier layer.

With particular advantage the PSA systems of the invention may be used for producing punched products. The punched product may be produced from a backing material coated on one or both sides with an anisotropic pressure sensitive adhesive.

Punched products of this kind can be used as single-sidedly or double-sidedly adhering labels, for adhesive bonding in the home and in industry, especially in automotive construction, for all assembly purposes, in the medical segment (patches, wound coverings) and the like, to mention but a few examples of their application. The punched products can, generally speaking, be employed wherever adhesive labels and adhesive sheets are used. They are particularly appropriate in applications where there is emphasis on a clean, undamaged edge to the punched product.

Further possible PSA tape applications are described below. When cable harnesses are used in the engine compartment, the differences in temperature which occur are in some cases very great. Accordingly, acrylic block copolymer PSA tapes can be used with advantage for such applications. Unlike a standard commercial PSA, an oriented PSA will contract, when heated, by the shrinkback, described above and measured, and so will form a firm bond between the cables and the insulating nonwoven (shrink adhesive). The shrinkback effect can also be exploited in the context of adhesive bonds on convex surfaces. By applying a PSA tape to a convex surface, followed by heating, the PSA tape contracts and thus conforms to the convexity of the substrate. In this way, bonding is greatly facilitated and the number of air inclusions between substrate and tape is distinctly reduced. The pressure sensitive adhesive is able to apply the optimum activity. This effect may be assisted further by an oriented backing material. Following application, under heating, both the backing material and the oriented PSA shrink, so that the bonds on the convexity are completely free from stresses.

The PSAs of the invention likewise offer a wide scope for applications which advantageously utilize the advantages of the low extension in the longitudinal (machine) direction and also the possibility of shrinkback.

The property of preextension of the PSAs can also be utilized to outstanding effect. A further exemplary field of application for such highly oriented acrylic PSAs is that of strippable double-sided adhesive bonds. Unlike conventional strippable products, the oriented PSA is already preextended by several 100%, so that in order to remove the double-sided adhesive bond the PSA need only be extended by a few percent more in the direction of stretching. With particular preference, these products are produced with a layer thickness of several 100 $\mu$m.

EXPERIMENTS

The following test methods were used to evaluate the technical adhesive properties of the PSA systems produced.

Test Methods

180° Bond Strength Test (Test A)

A strip, 20 mm wide, of a PSA coated onto siliconized release paper was transferred by lamination to a PET film, 25

µm thick and provided with a Saran primer, and then this PSA tape specimen was applied to a steel plate. The PSA strip was pressed down twice onto the substrate using a 2 kg weight. The adhesive tape was then immediately removed from the substrate at 30 mm/min and at an angle of 180°. The steel plates were washed twice with acetone and once with isopropanol. The results are reported in N/cm and are averaged from three measurements. All measurements were conducted at room temperature under standardized climatic conditions.

Measurement of the Birefringence (Test B)
Version 1

Two crossed polarization filters were placed in the sample beam of a spectrophotometer, model Uvikon 910. Oriented acrylates were fixed between two slides. The path length of the oriented sample was determined from preliminary experiments by means of a thickness gage. The sample thus prepared was placed in the measuring beam of the spectrophotometer such that its direction of orientation deviated by 45° in each case from the optical axes of the two polarization filters. The transmission was then followed over time by means of time-resolved measurement.

The transmission data were then used to determine the birefringence, in accordance with the following relationship:
$T=\sin^2(\pi \times R)$ The retardation, R, is made up as follows:

$$R = \frac{d}{\lambda} \Delta n$$

The transmission, additionally, is given by:

$$T = \frac{I_t}{I_0}$$

This leads, ultimately, for the birefringence, to:

$$\Delta n = \frac{\lambda}{\pi d} \arcsin \sqrt{T}.$$

In the formulae:
d=sample thickness
λ=wavelength
$I_t$=intensity of the emergent (transmitted) light beam
$I_0$=intensity of the incident light beam
Version 2

The birefringence was measured using an experimental setup such as is described analogously in the Encyclopedia of Polymer Science, John Wiley & Sons, Vol. 10, p. 505, 1987 as a circular polariscope. The light emitted by a diode-pumped solid-state laser, of wavelength λ=532 nm, is first subjected to linear polarization by a polarization filter and then to circular polarization at λ=532 nm using a λ/4 plate. The laser beam thus polarized is then guided through the oriented acrylic composition. Since acrylic compositions are highly transparent, the laser beam is able to pass through virtually unhindered. Where the polymer molecules of the acrylic composition are oriented, the result is a change in the polarizability of the acrylic composition depending on observation angle (birefringence). The electrical field vector of the circularly polarized laser beam, as a result of this effect, undergoes a rotation about the axis of progression of the laser beam. After departing the sample, the laser beam manipulated in this way is guided through a second λ/4 plate with λ=532 nm whose optical axis differs by 90° from the optical axis of the first λ/4 plate. This filter is followed by a second polarization filter which deviates likewise by 90° from the first polaroid filter. Finally, the intensity of the laser beam is measured using a photosensor.

Gel Permeation Chromatography (GPC) (Test C)

The average molecular weights $M_n$ (numerical average) and $M_w$, (weight average) and the polydispersity D were determined by gel permeation chromatography. The eluent used was THF containing 0.1% by volume trifluoroacetic acid. Measurement was carried out at 25° C. The precolumn used was PSS-SDV, 5 µ, $10^3$ Å, ID 8.0 mm×50 mm. Separation was carried out using the columns PSS-SDV, 5 µ, $10^3$ and also $10^5$ and $10^6$ each of ID 8.0 mm×300 mm. The sample concentration was 4 g/l, the flow rate 1.0 ml per minute. Measurement was carried out against polystyrene standards.

Measurement of the Shrinkback (Test D)

To measure the shrinkback, the pressure sensitive adhesive was coated from the melt through a die onto a siliconized release paper. Strips at least 30 mm wide and 20 cm long were cut parallel to the coating direction of the hotmelt. At application rates of 130 g/m², 3 strips, and at 50 g/m² 8 strips, were laminated together in order to give comparable layer thicknesses. The specimen obtained in this way was then cut to a width of 20 mm exactly, and strips of paper were stuck over it at each end with a spacing of 15 cm. The test specimen thus prepared was then suspended vertically at RT and the change in length was monitored over time until no further shrinkage of the sample could be found. The initial length, reduced by the final value, was then expressed as the shrinkback, in percent based on the initial length.

For measuring the orientation following a longer period of time, the coated and oriented PSAs were stored as swatches for a prolonged period of time, and then analyzed in analogy to test method D.

Preparations

Preparation of a RAFT Regulator

The regulator bis-2,2'-phenylethyl trithiocarbonate was prepared starting from 2-phenylethyl bromide using carbon disulfide and sodium hydroxide in accordance with a specification from Synth. Comm., 1988, 18 (13), 1531. Yield: 72%. $^1$H-NMR (CDCl$_3$), δ:7.20–7.40 ppm (m, 10H); 3.81 ppm (m, 1H); 3.71 ppm (m, 1H); 1.59 ppm (d, 3H); 1.53 ppm (d, 3H).

Preparation of Polystyrene (A)

A 2 L reactor conventional for radical polymerization is charged under nitrogen with 362 g of styrene and 3.64 g of bis-2,2'-phenylethyl trithiocarbonate regulator. This initial charge is heated to an internal temperature of 110° C. and initiated with 0.15 g of Vazo 67® (DuPont). After a reaction time of 10 hours, 100 g of toluene are added. After a reaction time of 24 hours, initiation is carried out with a further 0.1 g of Vazo 67®, and polymerization is continued for 24 hours. In the course of the polymerization there is a marked rise in viscosity. To compensate this, 150 g of toluene are added for final dilution after 48 hours.

The polymer is purified by precipitating it from 4.5 liters of methanol, filtering the precipitate on a frit and then drying it in a vacuum drying oven.

Gel permeation chromatography (test C) against polystyrene standards gave $M_n$=29,300 g/mol and $M_w$=35,500 g/mol.

Preparation of Polystyrene (B)

A 2 L reactor conventional for radical polymerization is charged under nitrogen with 1,500 g of styrene and 9.80 g of bis-2,2'-phenylethyl trithiocarbonate regulator. This initial charge is heated to an internal temperature of 120° C. and initiated with 0.1 g of Vazo 67® (DuPont). After a reaction time of 24 hours, 200 g of toluene are added. After a reaction time of 36 hours, a further 200 g of toluene are added. In the course of the polymerization there is a marked rise in viscosity. After 48 hours, the polymerization is terminated. The polymer is purified by precipitating it from 4.5 liters of methanol, filtering the precipitate on a frit and then drying it in a vacuum drying oven.

Gel permeation chromatography (test C) against polystyrene standards gave $M_n$=36,100 g/mol and $M_w$=44,800 g/mol.

Preparation of the Samples

Example 1

A reactor conventional for radical polymerizations was charged with 32 g of trithio-carbonate-functionalized polystyrene (A), 442 g of 2-ethylhexyl acrylate, 35 g of acrylic acid and 0.12 g of Vazo 67™ (DuPont). Argon was passed through for 20 minutes and the reactor was degassed twice, after which the charge was heated to 70° C. with stirring and polymerized for 24 hours. After the polymerization had been ended by cooling to room temperature, the hotmelt was isolated by removal of the solvent in a vacuum drying oven at 50° C. under a pressure of 10 mm. Gel permeation chromatography (test C) against polystyrene standards gave $M_n$=114,400 g/mol and $M_w$=217,000 g/mol.

Using a Haake extruder consisting of Haake Rheocord®, Haake Rheomex® and Haake RF 1 Roll Feeder® and a coathanger die with a gap width of 300 μm, the hot melt was then coated at different temperatures onto a siliconized release paper, at a rate of 50 g/m².

Test methods A and D were carried out.

Example 2

A reactor conventional for radical polymerizations was charged with 32 g of trithio-carbonate-functionalized polystyrene (A), 442 g of 2-ethylhexyl acrylate, 17 g of acrylic acid and 0.12 g of Vazo 67™ (DuPont). Argon was passed through for 20 minutes and the reactor was degassed twice, after which the charge was heated to 70° C. with stirring and polymerized for 24 hours. After the polymerization had been ended by cooling to room temperature, the hotmelt was isolated by removal of the solvent in a vacuum drying oven at 50° C. under a pressure of 10 mm. Gel permeation chromatography (test C) against polystyrene standards gave $M_n$=98,400 g/mol and $M_w$=185,000 g/mol. Using a Haake extruder consisting of Haake Rheocord®, Haake Rheomex® and Haake RF 1 Roll Feeder® and a coathanger die with a gap width of 300 μm, the hot melt was then coated at different temperatures onto a siliconized release paper, at a rate of 50 g/m².

Test methods A and D were carried out.

Example 3

A reactor conventional for radical polymerizations was charged with 600 g of trithio-carbonate-functionalized polystyrene (A), 2,142 g of n-butyl acrylate and 1,200 g of acetone. With stirring and under nitrogen gas, the mixture was heated to an internal temperature of 65° C. and 0.1 g of Vazo 67™ (DuPont) was added. The reactor was heated to 70° C. with stirring and the mixture was polymerized for 24 hours. After the polymerization had been ended by cooling to room temperature, the hotmelt was isolated by removal of the solvent in a vacuum drying oven at 50° C. under a pressure of 10 mm. Gel permeation chromatography (test C) against polystyrene standards gave $M_n$=72,200 g/mol and $M_w$=117,000 g/mol. Using a Haake extruder consisting of Haake Rheocord®, Haake Rheomex® and Haake RF 1 Roll Feeder® and a coathanger die with a gap width of 300 μm, the hot melt was then coated at different temperatures onto a siliconized release paper, at a rate of 50 g/m².

Test methods A and D were carried out.

Example 4

A reactor conventional for radical polymerizations was charged with 700 g of trithio-carbonate-functionalized polystyrene (B), 3,063 g of n-butyl acrylate and 1,600 g of acetone. With stirring and under nitrogen gas, the mixture was heated to an internal temperature of 65° C. and 0.1 g of Vazo 67™ (DuPont) was added. The reactor was heated to 70° C. with stirring and the mixture was polymerized for 24 hours. After a reaction time of 4 hours, the batch was diluted with 300 g of acetone. After 19 hours, it was diluted again with 300 g of acetone. After the polymerization had been ended by cooling to room temperature, the hotmelt was isolated by removal of the solvent in a vacuum drying oven at 50° C. under a pressure of 10 mm. Gel permeation chromatography (test C) against polystyrene standards gave $M_n$=111,300 g/mol and $M_w$=197,000 g/mol.

Using a Haake extruder consisting of Haake Rheocord®, Haake Rheomex® and Haake RF 1 Roll Feeder® and a coathanger die with a gap width of 300 μm, the hot melt was then coated at different temperatures onto a siliconized release paper, at a rate of 50 g/m².

Test methods A and D were carried out.

Example 5

A reactor conventional for radical polymerizations was charged with 744 g of trithio-carbonate-functionalized polystyrene (B), 2,405 g of n-butyl acrylate, 32 g of acrylic acid, 812.5 g of isobornyl acrylate and 1,500 g of acetone. With stirring and under nitrogen gas, the mixture was heated to an internal temperature of 65° C. and 0.1 g of Vazo 67™ (DuPont) was added. The reactor was heated to 70° C. with stirring and the mixture was polymerized for 24 hours. After a reaction time of 7 hours, the batch was diluted with 300 g of acetone. After the polymerization had been ended by cooling to room temperature, the hotmelt was isolated by removal of the solvent in a vacuum drying oven at 50° C. under a pressure of 10 mm. Gel permeation chromatography (test C) against polystyrene standards gave $M_n$=92,800 g/mol and $M_w$=155,000 g/mol.

Using a Haake extruder consisting of Haake Rheocord®, Haake Rheomex® and Haake RF 1 Roll Feeder® and a coathanger die with a gap width of 300 μm, the hot melt was then coated at different temperatures onto a siliconized release paper, at a rate of 50 g/m².

Test methods A and D were carried out.

Results

In order to investigate the orientation of the PSA systems, particularly that of PSAs based on acrylic block copolymers, first of all a variety of polystyrene block copolymers were prepared by a controlled radical polymerization. In terms of temperature stability and flow viscosity, all of the block copolymers can be processed as hotmelts. To produce oriented PSAs, the block copolymers were processed from the melt and were preoriented within the die by the flow process. The adhesive film is then transferred to the backing material with a defined layer thickness. In order to set the layer thickness, a defined draw ratio between die width and layer thickness is needed. In these experiments, the draw ratio was set at 1:6.

As a result of the ratio of die gap width and layer thickness of the adhesive on the backing material, however, the extent of orientation of the polymer chains can be varied freely.

For experimental confirmation, the adhesives were coated at different temperatures. To minimize the relaxation time, the PSAs were applied directly to a siliconized release paper at room temperature. For the purpose of analysis for the extent of orientation, the shrinkback and the Δn (test B, version 1, and test D) were measured. The results are set out in table 1.

TABLE 1

Experimental parameters relating to the orientation of block copolymers

| Example | Shrinkback [%] | Coating temperature [° C.] | Δn |
|---|---|---|---|
| 1 | 50 | 180 | $9.3 \cdot 10^{-4}$ |
| 1 | 42 | 195 | $4.2 \cdot 10^{-5}$ |
| 1 | 40 | 210 | $6.0 \cdot 10^{-5}$ |
| 2 | 41 | 170 | $5.2 \cdot 10^{-5}$ |
| 2 | 37 | 190 | $7.8 \cdot 10^{-5}$ |
| 2 | 34 | 200 | $9.4 \cdot 10^{-5}$ |
| 3 | 13 | 150 | $7.3 \cdot 10^{-6}$ |
| 3 | 12 | 160 | $7.8 \cdot 10^{-6}$ |
| 3 | 9 | 170 | $9.8 \cdot 10^{-6}$ |
| 4 | 20 | 140 | $5.5 \cdot 10^{-6}$ |
| 4 | 14 | 150 | $7.0 \cdot 10^{-6}$ |
| 4 | 12 | 160 | $7.7 \cdot 10^{-6}$ |
| 5 | 22 | 140 | $5.1 \cdot 10^{-6}$ |
| 5 | 15 | 150 | $6.5 \cdot 10^{-6}$ |
| 5 | 13 | 160 | $7.2 \cdot 10^{-6}$ |

Δn: Difference in the refractive indices $n_{MD}$ in the direction of stretching and $n_{CD}$ perpendicular thereto.

The application rate remained constant at 50 g/m$^2$.

Orientation within the PSAs was determined by quantifying the birefringence and by measuring the shrinkback. The refractive index n of a medium is given by the ratio of the speed of light $c_0$ in a vacuum to the speed of light c in the medium in question ($n = c_0/c$), with n being a function of the wavelength of the respective light. The difference Δn between the refractive index $n_{MD}$ measured in a preferential direction (direction of stretching, machine direction MD) and the refractive index $n_{CD}$ measured in a direction to the preferential direction (cross direction CD), in other words $\Delta n = n_{MD} - n_{CD}$, serves as a measure of the orientation of the PSA. This value can be obtained by the measurements described in test B.

All samples showed orientation of the polymer chains. The Δn values found are listed in table 1, with the greatest orientation being measured for example 1 at a coating temperature of 180° C. ($\Delta n = 9.3 \cdot 10^{-4}$). In this case the shrinkback was 50%. From table 1 it can be seen that the orientation of the adhesives can be controlled by the coating temperature. By raising the coating temperature, for example, the shrinkback can be reduced. Further influencing factors are the comonomer composition, the overall molecular weight of the block copolymer, and the molecular weights of the middle block and of the end blocks. By varying these parameters, a multiplicity of different characteristics of the orientation can be set.

Further parameters are the draw ratio (derived from the gap width of the coating die in relation to the layer thickness of the PSA film on the backing) and also the coating speed, through the extent of shearing introduced.

In order to investigate the long-term stability of the orientation, the shrinkback values of examples 1 to 5 were measured again after a storage time of one month at room temperature. The results are summarized in table 2.

TABLE 2

| Example | Shrinkback after storage [%] | Coating temperature [° C.] |
|---|---|---|
| 1 | 44 | 180 |
| 1 | 38 | 195 |
| 1 | 35 | 210 |
| 2 | 35 | 170 |
| 2 | 33 | 190 |
| 2 | 30 | 200 |
| 3 | 11 | 150 |
| 3 | 10 | 160 |
| 3 | 6 | 170 |
| 4 | 16 | 140 |
| 4 | 12 | 150 |
| 4 | 11 | 160 |
| 5 | 20 | 140 |
| 5 | 12 | 150 |
| 5 | 10 | 160 |

The measured shrinkback values in table 2 illustrate that the shrinkback and hence the orientation is almost completely retained after storage for one month. There is hardly any difference between the values measured and the values for the fresh specimens. Accordingly, as a result of the immediate formation of a physical network of polystyrene domains, the orientation is frozen inside the PSA.

This property is especially advantageous for PSA application, since the PSA tapes thus produced retain their selling properties over a long period of time.

For use as a pressure sensitive adhesive, the bond strength for steel of examples 1 to 5 was additionally measured. The figures are summarized in table 3.

TABLE 3

| Example | BS-steel [N/cm] |
|---|---|
| 1 | 5.1 |
| 2 | 3.8 |
| 3 | 3.6 |
| 4 | 3.6 |
| 5 | 3.5 |

BS: bond strength to steel
Application rate 50 g/m$^2$

The figures are situated at a level which is typical for block copolymers. In contrast, the stress/strain characteristics, particularly of the highly oriented example 1, show a marked influence of the orientation on the physical properties of the PSAs.

The highly oriented examples show a significantly lower extension in the direction of stretching. After just a very short length the stress rises quickly and the samples tear. In the cross direction, examples can be stretched significantly further, for example well over 1000%, but are also of lower tensile strength in this direction.

This behavior is of great interest in particular for self-adhesive strips which can be redetached without residue by stretching, such as tesa Powerstrip™, since in this case the bond strength is reduced on stretching, and accordingly these PSA tapes can be removed again from the substrate without residue. Using the oriented block copolymers, the required stretch for achieving a similar effect is much less in the case of the specimens.

We claim:

1. A pressure sensitively adhesive system comprising a pressure sensitive adhesive which is comprised of at least one block copolymer, the weight fraction or fractions of said at least one block copolymer totaling at least 50% of the pressure sensitive adhesive, wherein if said at least one block copolymer is one block copolymer, said one block copolymer is formed at least in part of (meth)acrylic acid derivatives and comprises the unit P(A)-P(B)-P(A), and wherein if said at least one block copolymer is more than one block copolymer at least one of said more than one block copolymers is formed at least in part of (meth)acrylic acid derivatives, and at least one of said more than one block copolymers comprises at least the unit P(A)-P(B)-P(A), said unit P(A)-P(B)-P(A) comprising at least one polymer block P(B) and at least two polymer blocks P(A), where P(A) independently of one another represent homopolymer blocks or copolymer blocks of monomers A, the polymer blocks P(A) each having a softening temperature in the range from +20° C. to +175° C., P(B) represents a homopolymer block or copolymer block of monomers B, the polymer block P(B) having a softening temperature in the range from −130° C. to +10° C., the polymer blocks P(A) and P(B) are not homogeneously miscible with one another, wherein the pressure sensitively adhesive system is oriented, possessing a preferential direction, with the refractive index $n_{MD}$ measured in the preferential direction being greater than the refractive index $n_{CD}$ measured in a direction perpendicular to the preferential direction.

2. The system as claimed in claim 1, wherein the difference $\Delta n = n_{MD} - n_{CD}$ is at least $1 \cdot 10^{-5}$.

3. The system as claimed in claim 1, wherein the adhesive has a shrinkback, defined by test method D, of at least 5%.

4. The system as claimed in claim 1, wherein the structure of at least one block copolymer is of one or more of the following general formulae:

   (I)

   (II)

   (III)

   (IV), where n=3 to 12, m=3 to 12 and X is a polyfunctional branching unit.

5. The system as claimed in claim 1, wherein at least one block copolymer has a symmetrical structure wherein the polymer blocks P(A) are identical in chain length and/or chemical structure and/or polymer blocks P(B) are identical in chain length and/or chemical structure.

6. The system as claimed in claim 1, wherein the stress/strain characteristics in the longitudinal direction are different than those in the transverse direction.

7. The system as claimed in claim 1, wherein at least one block copolymer meets one or more of the following criteria:

a molar mass $M_n$ of between 25,000 and 600,000 g/mol, a polydispersity $D=M_w/M_n$ of not more than 3, a polymer block P(A) fraction of between 5 and 49% by weight, based on the triblock copolymer composition, one or more grafted-on side chains.

8. The system as claimed in claim 1, wherein the ratio of the chain lengths of the polymer blocks P(A) to those of the polymer blocks P(B) is such that the polymer blocks P(A) are present as a disperse phase ("domains") in a continuous matrix of the polymer blocks P(B).

9. The system as claimed in claim 1, wherein the pressure sensitive adhesive comprises a polymer blend of one or more of said block copolymers with at least one diblock copolymer P(A)-P(B), where the polymer blocks P(A) independently of one another represent homopolymer of copolymer blocks or the monomers A, the polymer blocks P(A) each having a softening temperature in the range from +20° C. to +175° C., and where the polymer blocks P(B) independently of one another represent homopolymer or copolymer blocks of the monomers B, the polymer blocks P(B) each having a softening temperature from the range from −130° C. to +10° C., and/or with at least one polymer P'(A) and/or P'(B), where the polymers P'(A) represent homopolymers and/or copolymers of the monomers A, the polymers P'(A) each having a softening temperature in the range from +20° C. to +175° C., where the polymers P'(B) represent homopolymers and/or copolymers of the monomers B, the polymers P'(B) each having a softening temperature in the range from −130° C. to +10° C., and where the polymers P'(A) and P'(B), respectively, are optionally miscible with the polymer blocks P(A) and P(B), respectively.

10. The system as claimed in claim 9, wherein at least one diblock copolymer meets one or more of the following criteria:

a molar mass $M_n$ of between 5,000 and 600,000 g/mol, a polydispersity $D=M_w/M_n$ of not more than 3, a polymer block P(A) fraction of between 3 and 50% by weight, based on the diblock copolymer composition, one or more grafted-on side chains.

11. The system as claimed in claim 1, wherein compounds from the following groups are chosen as monomers B:

from 75 to 100% by weight of acrylic and/or methacrylic acid derivatives of the general structure (VI)

   (VI)

where $R^1$=H or $CH_3$ and $R^2$=H or linear, branched or cyclic, saturated or unsaturated alkyl radicals having from 1 to 30 carbon atoms, up to 25% by weight of vinyl compounds, optionally containing functional groups.

12. The system as claimed in claim 1, wherein the pressure sensitive adhesive further comprises one or more members of the group consisting of tackifier resins, plasticizers, fillers, nucleators, blowing agents, compounding agents and aging inhibitors.

13. The system as claimed in claim 1, wherein said system is in the form of a single-layer product structure.

14. A multilayer product structure, wherein at least one of the layers is composed of the pressure sensitive adhesive system of claim 1, and at least one of the other layers is optionally composed of an elastomer.

15. The multilayer product structure as claimed in claim 14, comprising at least one backing or carrier layer.

16. A process for producing the pressure sensitive adhesive system of claim 1, which comprises coating the pressure sensitive adhesive from the melt.

17. The process as claimed in claim 16, wherein the pressure sensitive adhesive system is stretched during coating from the melt.

18. The process as claimed in claim 16, wherein the adhesive is coated through a melt die or through an extrusion die.

19. The process as claimed in claim 17, wherein the degree of orientation is controlled by the coating temperature and/or the draw ratio.

20. A single-sided or double-sided pressure sensitive adhesive tape or transfer tape comprising a pressure sensitively adhesive system comprising a pressure sensitive adhesive which is comprised of at least one block copolymer, the weight fraction or fractions of said at least one block copolymers totaling at least 50% of the pressure sensitive adhesive, one block copolymer being formed at least in part of (meth)acrylic acid derivatives, and at least one block copolymer comprising at least the unit P(A)-P(B)-P(A) comprising at least one polymer block P(B) and at least two polymer blocks P(A), where P(A) independently of one another represent homopolymer blocks or copolymer blocks of monomers A, the polymer blocks P(A) each having a softening temperature in the range from +20° C. to +175° C., P(B) represents a homopolymer block or copolymer block of monomers B, the polymer block P(B) having a softening temperature in the range from −130° C. to +10° C., the polymer blocks P(A) and P(B) are not homogeneously miscible with one another, wherein the pressure sensitively adhesive system is oriented, possessing a preferential direction, with the refractive index $n_{MD}$ measured in the preferential direction being greater than the refractive index $n_{CD}$ measured in a direction perpendicular to the preferential direction.

21. The single-sided or double-sided pressure sensitive adhesive tape or transfer tape as claimed in claim 20 wherein said single-sided or double-sided pressure sensitive adhesive tape or transfer tape is a punched product.

22. The process as claimed in claim 17, wherein the adhesive is coated through a melt die or through an extrusion die.

23. The system of claim 7, wherein said molar mass $M_n$ is between 30,000 and 400,000 g/mol.

24. The system of claim 23, wherein said molar mass $M_n$ is between 50,000 and 300,000 g/mol.

25. The system of claim 7, wherein said polymer block P(A) fraction is between 7.5 and 35% by weight.

26. The system of claim 25, wherein said polymer block P(A) fraction is between 10 and 30% by weight.

27. The system of claim 8, wherein said domains are spherical or distortedly spherical or cylindrical domains.

28. The system of claim 10, wherein said molar mass $M_n$ is between 15,000 and 400,000 g/mol.

29. The system of claim 28, wherein said molar mass $M_n$ is between 30,000 and 300,000 g/mol.

30. The system of claim 10 wherein said polymer block P(A) fraction is between 5 and 35% by weight.

31. The system of claim 11, wherein said unsaturated alkyl radicals have from 4 to 18 carbon atoms.

32. The system of claim 12, wherein said tackifier resins are compatible with the polymer blocks P(B) and are present in a weight fraction of up to 40% by weight, based on the weight of adhesive.

33. The system of claim 32, wherein said tackifier resins are present in an amount of 30% by weight, based on the weight of adhesive.

34. The multilayer product structure of claim 14, wherein said structure comprises two or three layers, and has a thickness of at least 10 μm.

35. The multilayer product structure of claim 34, wherein said structure has a thickness of at least 25 μm.

* * * * *